(12) United States Patent
Booth et al.

(10) Patent No.: US 11,878,734 B2
(45) Date of Patent: Jan. 23, 2024

(54) ROOF ASSEMBLY FOR A WORK VEHICLE

(71) Applicant: CNH Industrial America LLC, New Holland, PA (US)

(72) Inventors: David Sheldon Booth, Fargo, ND (US); John Torin Piper, Surprise, AZ (US); Michael J. Braun, Oswego, IL (US); Thomas Michael Curley, Detroit Lakes, MN (US); Aaron Francis Onken, Kindred, ND (US); David Larry Tveito, West Fargo, ND (US); Abhishek Shende, Vadodara (IN)

(73) Assignee: CNH Industrial America LLC, New Holland, PA (US)

( * ) Notice: Subject to any disclaimer, the term of this patent is extended or adjusted under 35 U.S.C. 154(b) by 93 days.

(21) Appl. No.: 17/718,751

(22) Filed: Apr. 12, 2022

(65) Prior Publication Data

US 2023/0202574 A1 Jun. 29, 2023

(30) Foreign Application Priority Data

Dec. 23, 2021 (IN) .............................. 202111060181

(51) Int. Cl.
*B62D 25/06* (2006.01)
*B60R 21/13* (2006.01)
*B62D 33/06* (2006.01)

(52) U.S. Cl.
CPC .............. *B62D 25/06* (2013.01); *B60R 21/13* (2013.01); *B62D 33/0617* (2013.01)

(58) Field of Classification Search
CPC ............................ B62D 25/06; B62D 33/0617
USPC ................................................ 296/210, 1.02
See application file for complete search history.

(56) References Cited

U.S. PATENT DOCUMENTS

| 3,550,950 | A | 12/1970 | Pollock |
| 3,967,850 | A | 7/1976 | Whisler |
| 4,508,382 | A | 4/1985 | Tsumoto et al. |
| 4,650,242 | A | 3/1987 | Obe et al. |
| 5,690,549 | A | 11/1997 | Webb et al. |
| 6,364,343 | B1 * | 4/2002 | Slota ..................... B60R 21/213 280/730.2 |

(Continued)

FOREIGN PATENT DOCUMENTS

| DE | 8914036 | 1/1990 |
| JP | H0966860 | 3/1997 |

(Continued)

OTHER PUBLICATIONS

Eger Products, Inc., Tractor Canopies, http://www.egerproducts.com/Images/documents/Eger%20Tractor%20Canopy.pdf, retrieved Aug. 11, 2021, 11 pages.

(Continued)

*Primary Examiner* — Dennis H Pedder
(74) *Attorney, Agent, or Firm* — Rickard K. DeMille; Rebecca L. Henkel

(57) ABSTRACT

A roof assembly for a work vehicle includes a grab rail and a grab rail support coupled to the grab rail. The grab rail support is configured to couple to a roof structure of the roof assembly, the grab rail support is configured to support the grab rail on the roof structure, the grab rail support has a hollow passage configured to facilitate passage of a wire, and the grab rail support has an inlet to the hollow passage configured to be positioned at an interior of the roof structure to enable the wire to extend from the interior of the roof structure into the hollow passage.

20 Claims, 7 Drawing Sheets

(56) References Cited

U.S. PATENT DOCUMENTS

| | | | |
|---|---|---|---|
| 7,172,209 B2 * | 2/2007 | Totani | B60R 21/213 |
| | | | 280/730.2 |
| 7,198,323 B2 | 4/2007 | Schoenauer et al. | |
| 8,485,589 B2 | 7/2013 | Obe et al. | |
| D720,781 S | 1/2015 | Venth et al. | |
| 8,925,960 B2 | 1/2015 | Uchida | |
| 9,033,402 B2 | 5/2015 | Salvini | |
| 9,045,028 B2 | 6/2015 | Ichikawa | |
| 10,071,665 B2 * | 9/2018 | Ibrahim | H04R 1/028 |
| 10,315,489 B2 | 6/2019 | Shimada | |
| 10,538,272 B2 | 1/2020 | Nada et al. | |
| 2004/0212221 A1 | 10/2004 | Sato | |
| 2006/0070310 A1 | 4/2006 | Oliver | |
| 2007/0267884 A1 * | 11/2007 | Failla | B60N 3/026 |
| | | | 296/1.02 |
| 2017/0101134 A1 | 4/2017 | Miyazaki | |
| 2019/0248421 A1 | 8/2019 | Jacobsthal et al. | |

FOREIGN PATENT DOCUMENTS

| | | |
|---|---|---|
| JP | 2007145143 | 6/2007 |
| JP | 2017114328 | 6/2017 |
| JP | 2018184100 | 11/2018 |
| KR | 200437979 | 1/2008 |
| KR | 200462348 | 9/2012 |
| KR | 20160034026 | 3/2016 |

OTHER PUBLICATIONS

Polymaster, Tractor Roofs, https://www.polymaster.com.au/agriculture/farm-storage-equipment/tractor-roofs/, retrieved Aug. 11, 2021, 5 pages.

U.S. Appl. No. 17/718,971, filed Apr. 12, 2022, David Sheldon Booth.

U.S. Appl. No. 29/820,718, filed Dec. 23, 2021, David Sheldon Booth.

U.S. Appl. No. 29/820,712, filed Dec. 23, 2021, David Sheldon Booth.

Steiger Tractor Service Brochure, Case IH Agriculture, 2013, p. 20, total pp. 3.

John Deere, 7R 210 Tractor, https://www.deere.com/en/tractors/row-crop-tractors/row-crop-7-family/7r-210-tractor/; retrieved Oct. 19, 2021, 6 pgs.

* cited by examiner

ROOF ASSEMBLY FOR A WORK VEHICLE

BACKGROUND OF THE INVENTION

The present disclosure relates generally to a roof assembly for a work vehicle.

Certain work vehicles, such as tractors, harvesters, and sprayers, have a cab configured to house an operator during operation of the work vehicle. The cab generally includes a roof configured to shield the operator from the sun and rain. Multiple devices may be mounted to the roof, such as lights, antennas, and sensors. Wires may extend through openings in a panel of the roof to the devices, thereby providing certain device(s) with electrical power and/or communicatively coupling certain device(s) to a controller. Each opening is generally sealed to block water and debris from passing through the roof panel. The process of sealing the roof panel may significantly increase the complexity, duration, and expense associated with manufacturing the roof. In addition, the wires extending along the roof may detract from the appearance of the work vehicle.

Furthermore, in certain embodiments, the work vehicle may include grab rails configured to facilitate movement of the operator around the work vehicle. The grab rails may be coupled to pillar(s)/column(s) of the work vehicle cab, thereby enabling the grab rails to support the weight of the operator. Unfortunately, the grab rails may be positioned within a field of view of the operator.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, a roof assembly for a work vehicle includes a grab rail and a grab rail support coupled to the grab rail. The grab rail support is configured to couple to a roof structure of the roof assembly, the grab rail support is configured to support the grab rail on the roof structure, the grab rail support has a hollow passage configured to facilitate passage of a wire, and the grab rail support has an inlet to the hollow passage configured to be positioned at an interior of the roof structure to enable the wire to extend from the interior of the roof structure into the hollow passage.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
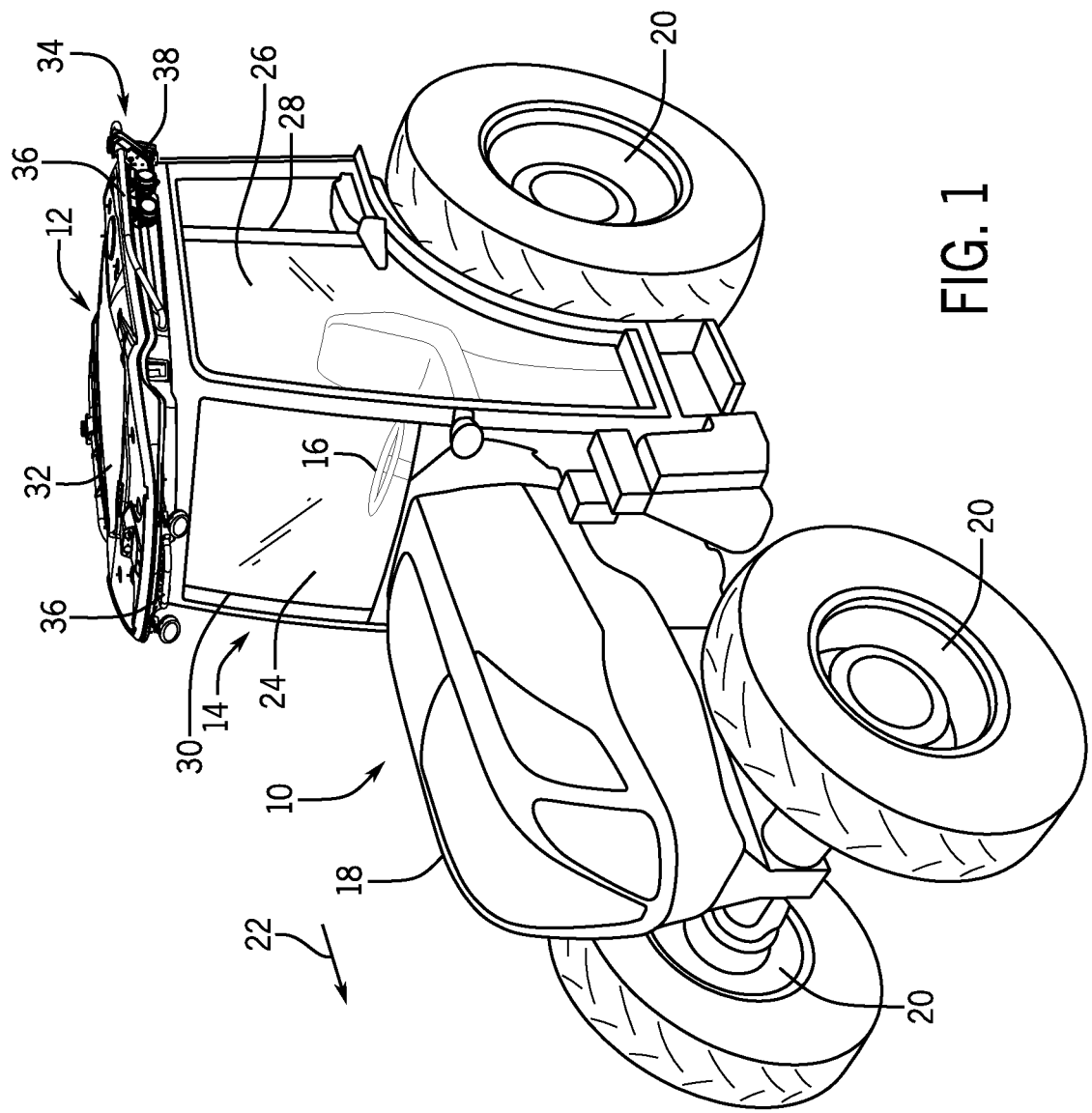
FIG. 1 is a perspective view of an embodiment of a work vehicle having an embodiment of a roof assembly.

FIG. 1 is a perspective view of an embodiment of a work vehicle 10 having an embodiment of a roof assembly 12. In the illustrated embodiment, the work vehicle 10 includes a cab 14 configured to house an operator. A steering wheel 16 is disposed within the cab 14 to facilitate control of the work vehicle 10. The cab 14 may also house additional controls to enable the operator to control various functions of the work vehicle (e.g., movement of a tool coupled to the work vehicle, speed of the work vehicle, etc.). In the illustrated embodiment, the work vehicle 10 includes a body 18 configured to house an engine, a transmission, other systems of the work vehicle 10, or a combination thereof. In addition, the work vehicle 10 includes wheels 20 configured to be driven by the engine, thereby driving the work vehicle 10 through a field and/or along a road in a direction of travel 22. While the work vehicle 10 includes wheels 20 in the illustrated embodiment, in other embodiments, the work vehicle may include tracks or a combination of wheels and tracks. Furthermore, while the work vehicle 10 is a tractor in the illustrated embodiment, in other embodiments, the work vehicle may be a harvester, a sprayer, a bulldozer, or any other suitable type of work vehicle.

In the illustrated embodiment, the cab 14 of the work vehicle 10 includes a windshield 24 and a door 26. The windshield 24 substantially blocks dirt, debris, and water from entering an interior of the cab 14. In addition, the door 26 selectively facilitates ingress and egress of the operator. In the illustrated embodiment, the door 26 is rotatably coupled to a frame of the cab 14 by a hinge 28 that enables the door 26 to rotate between the illustrated closed position and an open position. In the illustrated embodiment, the cab 14 also includes a windshield wiper 30. The windshield wiper 30 is configured to remove water from the windshield 24, thereby enhancing operator visibility.

The roof assembly 12 includes a roof panel 32 configured to shield the operator from sun and rain during operation of the work vehicle 10. In addition, the roof assembly 12 includes a grab rail assembly 34 having multiple grab rails 36 and multiple grab rail supports 38. As discussed in detail below, the grab rails 36 are distributed about a periphery of a roof structure of the roof assembly 12. The grab rails 36 are configured to facilitate movement of the operator around the work vehicle 10 (e.g., for maintenance operations, for reconfiguration operations, etc.).

In the illustrated embodiment, the grab rail supports 38 are coupled to the roof structure. In addition, each grab rail support 38 is coupled to one or more grab rails 36 and configured to support the grab rail(s) 36 on the roof structure. Furthermore, at least one grab rail support 38 has a hollow passage configured to facilitate passage of a wire, and the at least one grab rail support 38 has an inlet to the hollow passage configured to be positioned at an interior of the roof structure to enable the wire to extend from the interior of the roof structure into the hollow passage. Accordingly, the wire may extend from the interior of the roof structure to one or more devices external to the at least one grab rail support 38 via the hollow passage in the at least one grab rail support 38. As a result, the number of openings in the roof structure configured to facilitate passage of wires through the roof structure may be reduced, thereby reducing the complexity and cost associated with sealing the openings. Furthermore, because the wire is concealed within the at least one grab rail support 38, the appearance of the roof assembly 12 may be enhanced (e.g., as compared to a roof assembly in which a wire extends along an exterior surface of the roof structure).

Figure 2:
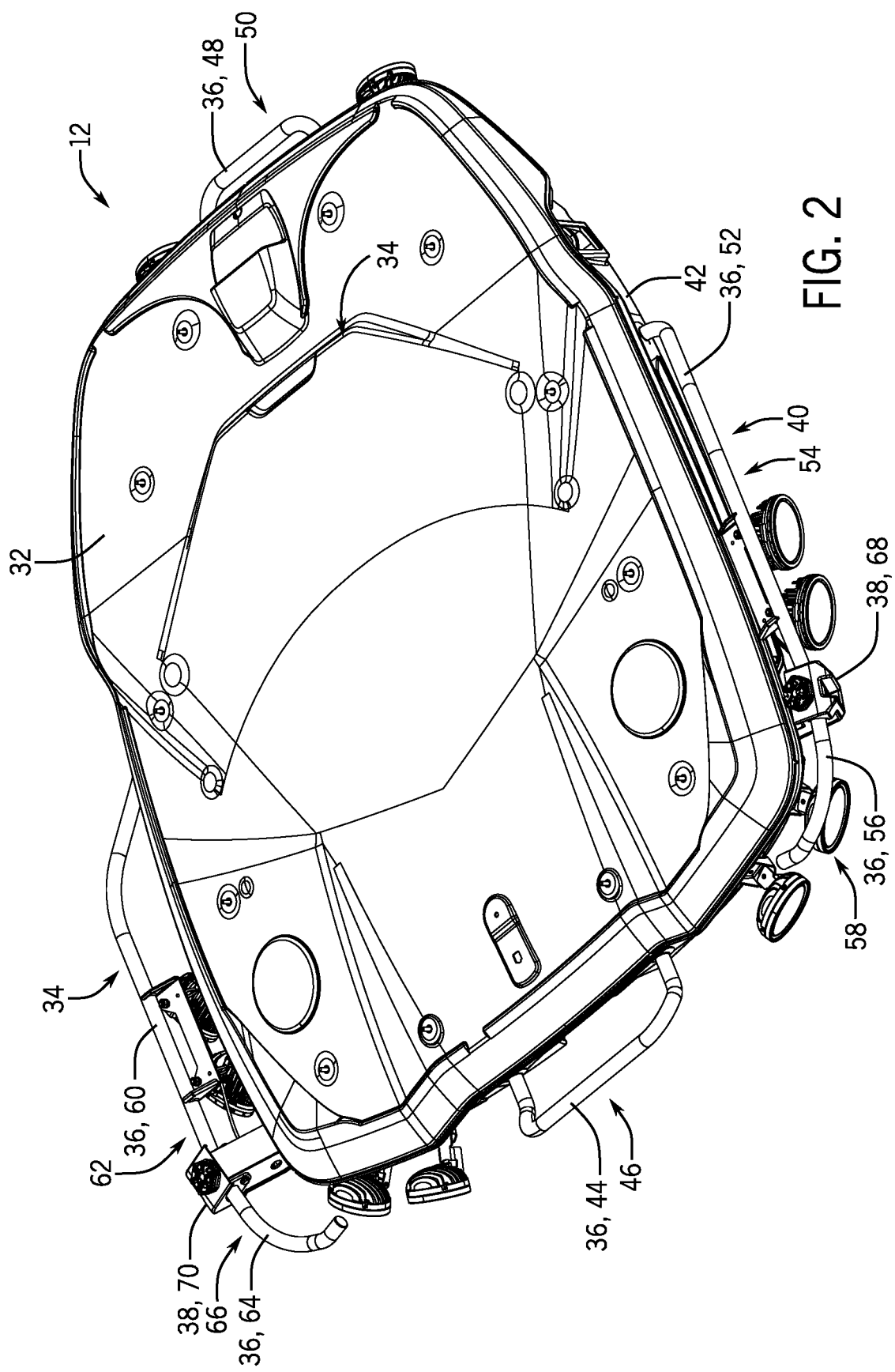
FIG. 2 is a perspective view of the roof assembly of FIG. 1, in which the roof assembly includes an embodiment of a grab rail assembly.

FIG. 2 is a perspective view of the roof assembly 12 of FIG. 1, in which the roof assembly 12 includes the grab rail assembly 34. As previously discussed, the grab rail assembly 34 includes multiple grab rails 36 distributed about a periphery 40 of a roof structure 42 of the roof assembly 12. In the illustrated embodiment, the grab rails 36 include a rearward grab rail 44 positioned at a rearward end 46 of the roof assembly 12, and the grab rails 36 include a forward grab rail 48 positioned at a forward end 50 of the roof assembly 12. Furthermore, the grab rails 36 include a right grab rail 52 positioned at a right end 54 of the roof assembly 12, and the grab rails 36 include a rearward right grab rail 56 extending around a rearward right corner 58 of the roof panel 32/roof structure 42. In addition, the grab rails 36 include a left grab rail 60 positioned at a left end 62 of the roof assembly 12, and the grab rails 36 include a rearward left grab rail 64 extending around a rearward left corner 66 of the roof panel 32/roof structure 42. The grab rails 36 are configured to facilitate movement of the operator around an exterior of the cab.

While the grab rails 36 include a single rearward grab rail 44 in the illustrated embodiment, in other embodiments, the grab rails may include more or fewer grab rails (e.g., 0, 2, 3, 4, or more) positioned at the rearward end of the roof assembly. Furthermore, while the grab rails 36 include a single forward grab rail 48 in the illustrated embodiment, in other embodiments, the grab rails may include more or fewer grab rails (e.g., 0, 2, 3, 4, or more) positioned at the forward end of the roof assembly. In addition, while the grab rails 36 include a single right grab rail 52 in the illustrated embodiment, in other embodiments, the grab rails may include more or fewer grab rails (e.g., 0, 2, 3, 4, or more) positioned at the right end of the roof assembly. While the grab rails 36 include a single left grab rail 60 in the illustrated embodiment, in other embodiments, the grab rails may include more or fewer grab rails (e.g., 0, 2, 3, 4, or more) positioned at the left end of the roof assembly. Furthermore, while the grab rails 36 include two grab rails extending around two respective corners of the roof panel 32/roof structure 42 in the illustrated embodiment, in other embodiments, the grab rails may include more or fewer grab rails (e.g., 0, 1, 3, 4, or more) extending around respective corner(s) of the roof panel/roof structure. For example, in certain embodiments, at least one of the grab rails extending around the rearward corners of the roof panel/roof structure may be omitted, and/or the grab rails may include at least one grab rail extending around a forward corner of the roof panel/roof structure.

In the illustrated embodiment, the grab rail assembly 34 includes two grab rail supports 38 coupled to the roof structure 42. Each grab rail support 38 is coupled to two respective grab rails 36 and configured to support the respective grab rails 36 on the roof structure 42. In the illustrated embodiment, a right grab rail support 68 of the grab rail supports 38 is coupled to the right grab rail 52 and to the rearward right grab rail 56. The right grab rail support 68 is configured to support the right grab rail 52 and the rearward right grab rail 56 on the roof structure 42. In addition, a left grab rail support 70 of the grab rail supports 38 is coupled to the left grab rail 60 and to the rearward left grab rail 64. The left grab rail support 70 is configured to support the left grab rail 60 and the rearward left grab rail 64 on the roof structure 42.

In the illustrated embodiment, a first end of the right grab rail 52 is coupled to the right grab rail support 68, and a second end of the right grab rail 52 is coupled to the roof structure 42. In addition, a first end of the left grab rail 60 is coupled to the left grab rail support 70, and a second end of the left grab rail 60 is coupled to the roof structure 42. Furthermore, the rearward right grab rail 56 is only coupled to the right grab rail support 68, and the rearward left grab rail 64 is only coupled to the left grab rail support 70. The rearward grab rail 44 is only coupled to the roof structure 42, and the forward grab rail 48 is only coupled to the roof structure 42.

While the right grab rail 52 is coupled to the right grab rail support 68 and to the roof structure 42 in the illustrated embodiment, in other embodiments, the right grab rail may only be coupled to the right grab rail support, the right grab rail may only be coupled to the roof structure, or the right grab rail may be coupled to multiple grab rail supports, alone or in combination with the roof structure. Furthermore, while the left grab rail 60 is coupled to the left grab rail support 70 and to the roof structure 42 in the illustrated embodiment, in other embodiments, the left grab rail may only be coupled to the left grab rail support, the left grab rail may only be coupled to the roof structure, or the left grab rail may be coupled to multiple grab rail supports, alone or in combination with the roof structure. In addition, while the rearward right grab rail 56 is only coupled to the right grab rail support 68 in the illustrated embodiment, in other embodiments, the rearward right grab rail may be coupled to the right grab rail support and to the roof structure, the rearward right grab rail may only be coupled to the roof structure, or the rearward right grab rail may be coupled to multiple grab rail supports, alone or in combination with the roof structure. While the rearward left grab rail 64 is only coupled to the left grab rail support 70 in the illustrated embodiment, in other embodiments, the rearward left grab rail may be coupled to the left grab rail support and to the roof structure, the rearward left grab rail may only be coupled to the roof structure, or the rearward left grab rail may be coupled to multiple grab rail supports, alone or in combination with the roof structure. Furthermore, while the rearward grab rail 44 is only coupled to the roof structure 42 in the illustrated embodiment, in other embodiments, the rearward grab rail may be coupled to one or more grab rail supports, alone or in combination with the roof structure. In addition, while the forward grab rail 48 is only coupled to the roof structure 42 in the illustrated embodiment, in other embodiments, the forward grab rail may be coupled to one or more grab rail supports, alone or in combination with the roof structure.

As disclosed herein, each grab rail (e.g., each grab rail of the roof assembly, each grab rail on the work vehicle, etc.) is only coupled to the roof structure and/or respective grab rail support(s), which is/are coupled to the roof structure. Accordingly, the grab rails may not extend into a field of view of the operator (e.g., while the operator is looking at the agricultural field), thereby enhancing operator visibility (e.g., as compared to grab rail(s) coupled to pillar(s)/column(s) of the cab). Furthermore, because each grab rail is coupled to the roof structure (e.g., via the grab rail support(s)), the grab rail may support a significant load (e.g., an entire body weight of the operator multiplied by a safety factor, etc.). As a result, the grab rails may be suitable for connection to an operator safety harness. For example, an operator may couple one end of a tie-off line/strap to a harness and the other end to a grab rail. In certain embodiments, the roof structure may be an element of a rollover protection system (ROPS) of the work vehicle. Accordingly, the roof structure may provide sufficient structural support to the grab rails for safety tie-off operations. While each grab rail is only coupled to the roof structure and/or respective grab rail support(s) in the illustrated embodiment, in other embodiments, at least one grab rail may be coupled to other component(s) of the work vehicle, such as pillar(s)/column(s) of the cab of the work vehicle.

As used herein, "coupled to the roof structure" refers to a coupling between a component (e.g., grab rail, grab rail support, etc.) and the roof structure without any intervening structural element of the work vehicle (e.g., column/pillar of the cab, member of the work vehicle chassis, etc.) disposed between the component and the roof structure. The coupling may be direct (e.g., via welded connection(s), fastener connection(s), adhesive connection(s), etc.), or the coupling may be indirect (e.g., via a bracket, via a mounting plate, etc.). Furthermore, as used herein, "roof structure" refers to the structural element(s) of the roof assembly that support the roof panel and other component(s) of the roof assembly (e.g., grab rail(s), light(s), antenna(s), etc.). The roof structure may be formed as a single weldment, from a single piece of material (e.g., molded polymeric material, molded composite material, formed sheet metal, additively manufactured metal, additively manufactured polymeric material, etc.), or from multiple elements (e.g., including metal element(s), polymeric element(s), composite element(s), etc.) coupled to one another (e.g., via adhesive connection(s), via fastener connection(s), via welded connection(s), etc.).

In the illustrated embodiment, each grab rail support 38 has a hollow passage configured to facilitate passage of a wire. In addition, each grab rail support 38 has an inlet to the hollow passage positioned at an interior of the roof structure 42 to enable the wire to extend from the interior of the roof structure 42 into the hollow passage. In certain embodiments, each grab rail support 38 has an outlet configured to enable the wire to extend out of the hollow passage to a device external to the grab rail support 38. Accordingly, wires may extend from an interior of the roof structure 42 to one or more devices external to the grab rail supports 38 via the respective hollow passages in the grab rail supports 38. As a result, the number of openings in the roof structure 42/roof panel 32 configured to facilitate passage of wires through the roof structure/roof panel may be substantially reduced, thereby substantially reducing the complexity and cost associated with sealing the openings. Furthermore, because one or more wires may be concealed within each grab rail support 38, the appearance of the roof assembly 12 may be enhanced (e.g., as compared to a roof assembly in which one or more wires extend along an exterior surface of the roof structure/exterior surface of the roof panel).

In the illustrated embodiment, each grab rail support 38 has a respective hollow passage, as disclosed above. However, in certain embodiments, at least one grab rail support (e.g., the right grab rail support and/or the left grab rail support) may not include a hollow passage configured to facilitate passage of a wire. Furthermore, while the grab rail assembly 34 includes two grab rail supports 38 in the illustrated embodiment, in other embodiments, the grab rail assembly may include more or fewer grab rail supports (e.g., 0, 1, 3, 4, 5, 6, or more). Furthermore, each grab rail support may be located at any suitable position relative to the roof structure.

Figure 3:
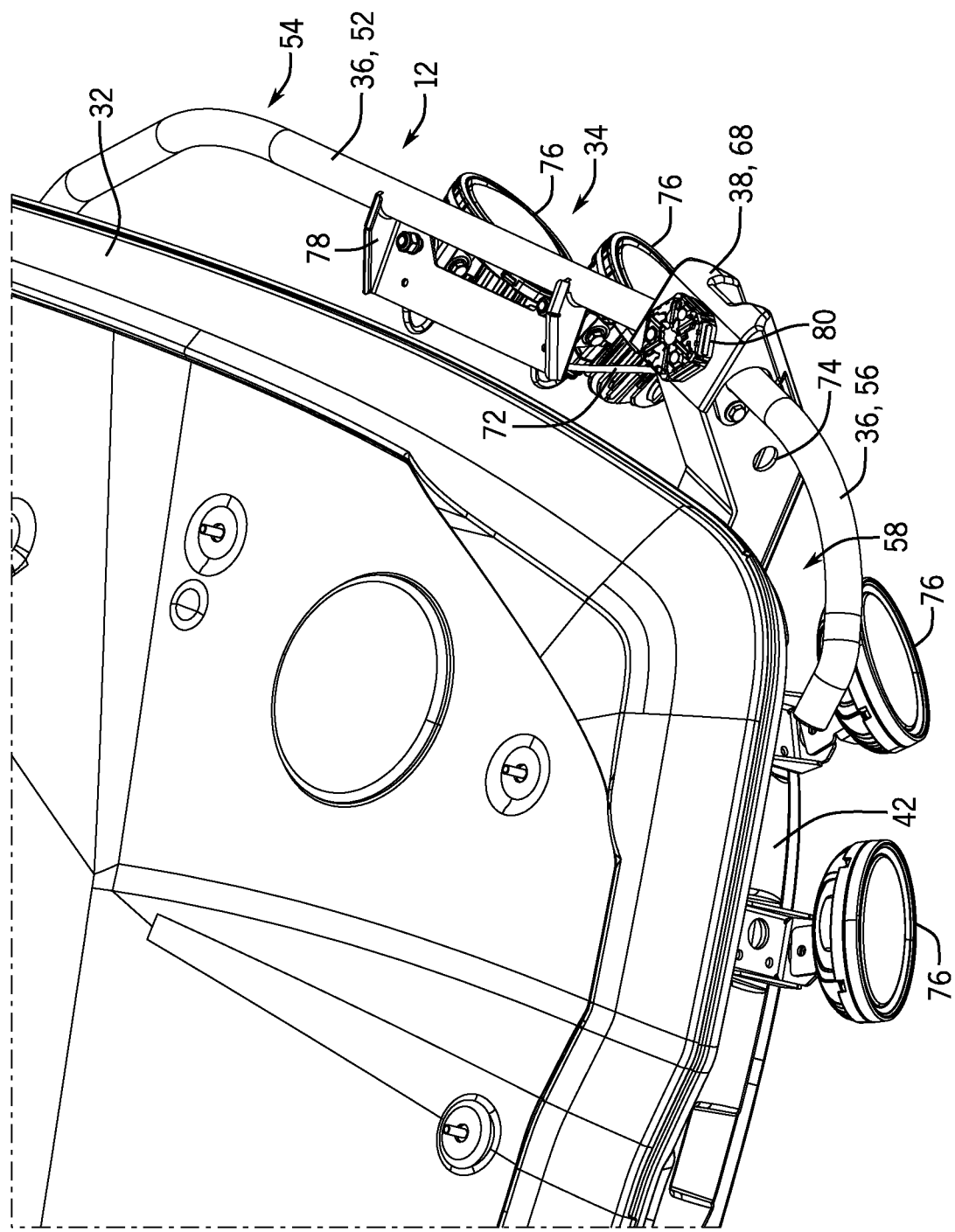
FIG. 3 is a perspective view of a portion of the grab rail assembly of FIG. 2, in which the grab rail assembly includes grab rails and a grab rail support.

FIG. 3 is a perspective view of a portion of the grab rail assembly 34 of FIG. 2, in which the grab rail assembly includes grab rails 38 (e.g., the right grab rail 52 and the rearward right grab rail 56) and a grab rail support 38 (e.g., the right grab rail support 68). As previously discussed, the right grab rail 52 is coupled to the right grab rail support 68, and the rearward right grab rail 56 is coupled to the right grab rail support 68. The right grab rail support 68 is coupled to the roof structure 42 and configured to support the grab rails 36 on the roof structure 42. In addition, the right grab rail 52 is coupled to the roof structure 42. As illustrated, a first end of the right grab rail 52 is coupled to the right grab rail support 68, and a second end of the right grab rail 52 is coupled to the roof structure 42.

Furthermore, as previously discussed, the right grab rail support 68 has a hollow passage configured to facilitate passage of a wire 72. The right grab rail support 68 also has an inlet to the hollow passage positioned at an interior of the roof structure 42 to enable the wire 72 to extend from the interior of the roof structure 42 into the hollow passage. In the illustrated embodiment, the right grab rail support 68 has outlets 74 configured to enable one or more wires 72 to extend out of the hollow passage to respective device(s) external to the right grab rail support 68. Because the wire 72 may extend from the interior of the roof structure 42 to respective device(s) external to the right grab rail support 68 via the hollow passage in the right grab rail support 68, the number of openings in the roof structure 42/roof panel 32 configured to facilitate passage of wires through the roof structure/roof panel may be reduced, thereby reducing the complexity and cost associated with sealing the openings. Furthermore, because the wire 72 is concealed within the right grab rail support 68, the appearance of the roof assembly 12 may be enhanced (e.g., as compared to a roof assembly in which the wire extends along an exterior surface of the roof structure/exterior surface of the roof panel). As discussed in detail below, the right grab rail support 68 includes multiple outlets, and any suitable number of wires (e.g., 0, 1, 2, 3, 4, or more) may extend through each outlet.

In the illustrated embodiment, the roof assembly 12 includes lights 76 configured to illuminate an area around the cab (e.g., while operating the work vehicle in low-light conditions). In the illustrated embodiment, two lights 76 are coupled to the roof structure 42 (e.g., via respective mounts and fasteners, etc.), and two lights 76 are coupled to the right grab rail 52. Accordingly, the right grab rail 52 is configured to support two lights 76 of the roof assembly 12. In the illustrated embodiment, a bracket 78 is coupled to the right grab rail 52 (e.g., via welded connection(s), via adhesive connection(s), via fastener connection(s), etc.), and the lights 76 are coupled to the bracket 78 (e.g., via respective mounts and fasteners, etc.). In the illustrated embodiment, the wire 72 extends through an outlet 74 of the right grab rail support 68 to one or more respective lights 76 coupled to the right grab rail 52 (e.g., the wire 72 may extend to both lights 76 via respective connectors). Furthermore, in certain embodiments, a wire may extend through an outlet of the right grab rail support to one or more respective lights coupled to the roof structure. While two lights are coupled to the roof assembly and two lights are coupled to the right grab rail in the illustrated embodiment, in other embodiments, at least one of the lights may be positioned in another suitable location relative to the roof structure. In certain embodiments, at least one light may be coupled to the rearward right grab rail, at least one light coupled to the roof structure may be omitted, at least one light coupled to the right grab rail may be omitted, or a combination thereof.

In the illustrated embodiment, the roof assembly 12 includes an antenna 80 coupled to the right grab rail support 68. The antenna 80 may be part of a spatial locating system (e.g., global positioning system, etc.), or the antenna may be part of a communication system. In the illustrated embodiment, the right grab rail support 68 includes an outlet positioned at the antenna 80. Accordingly, a wire may extend from the interior of the roof structure, through the inlet of the right grab rail support, through the hollow passage of the right grab rail support, and through the outlet of the right grab rail support to the antenna. Because the respective wire is entirely concealed by the roof panel/roof structure, the right grab rail support, and the antenna, the appearance of the roof assembly may be enhanced (e.g., as compared to a roof assembly in which a wire extends along an exterior surface of the roof structure and/or an exterior surface of the roof panel). While one antenna is coupled to the right grab rail support in the illustrated embodiment, in other embodiments, more or fewer antennas (e.g., of the same type and/or of different types) may be coupled to the right grab rail support. For example, 0, 1, 2, 3, 4, 5, 6, or more antennas may be coupled to the right grab rail support, and a wire may extend from each antenna into the hollow passage of the right grab rail support.

While wires coupled to antennas and lights are disclosed herein, in certain embodiments, wires coupled to other devices external to the right grab rail support (e.g., radio detection and ranging device(s), LiDAR device(s), camera(s), etc.) may extend through the hollow passage of the right grab rail support. Each wire may be configured to facilitate passage of electrical power and/or data signals. Furthermore, each wire may include electrical conductor(s), fiber optic cable(s), other suitable element(s), or a combination thereof. In addition, while wires are disclosed herein, in certain embodiments, one or more hydraulic and/or pneumatic lines may extend through the hollow passage of the right grab rail support.

Figure 4:
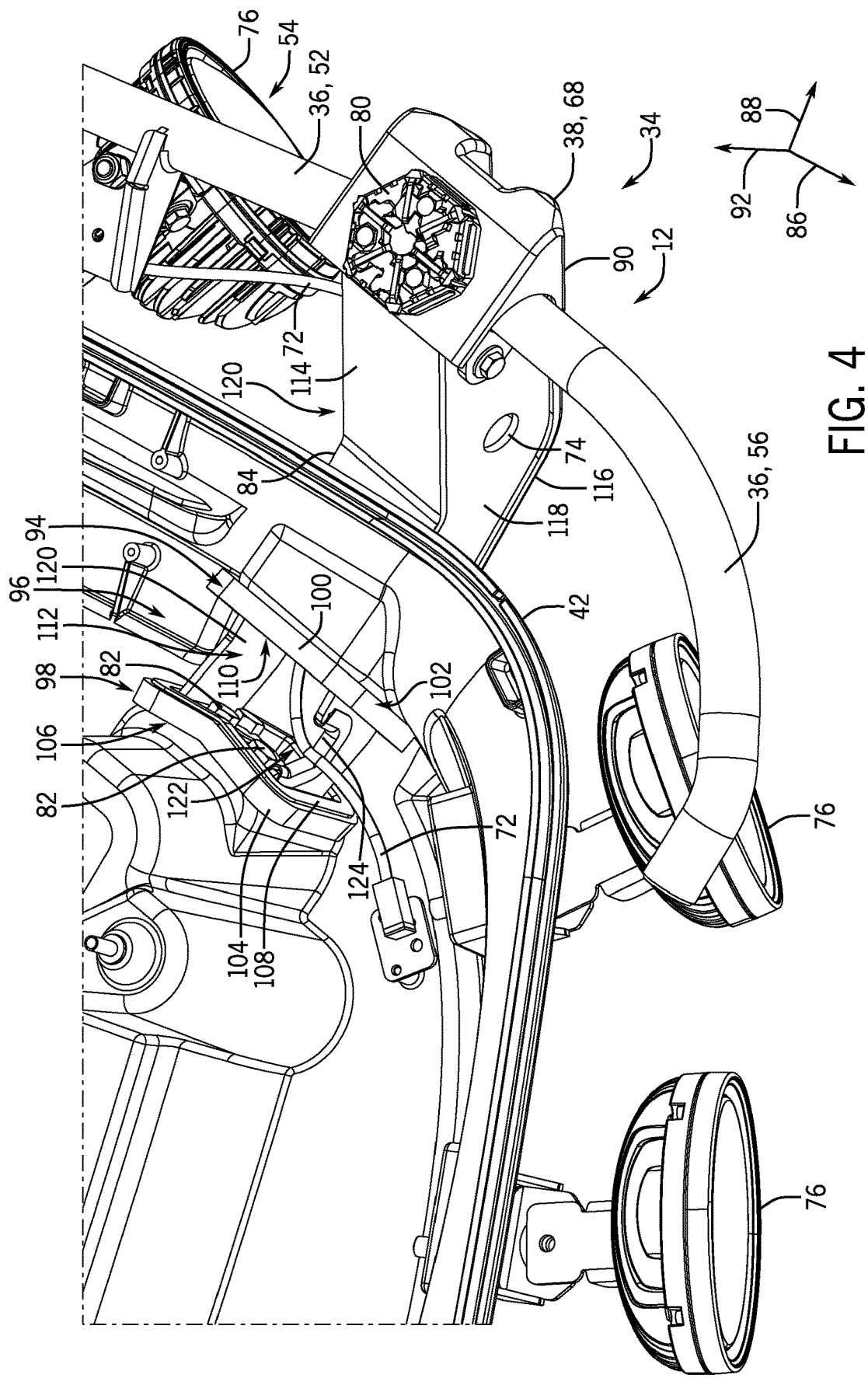
FIG. 4 is a perspective view of the grab rail support of FIG. 3, in which the grab rail support is coupled to a roof structure of the roof assembly.

FIG. 4 is a perspective view of the right grab rail support 68 of FIG. 3, in which the right grab rail support 68 is coupled to the roof structure 42 of the roof assembly 12. In the illustrated embodiment, the right grab rail support 68 is coupled to the roof structure 42 with fasteners 82 (e.g., bolts, screws, pins, rivets, etc.). While the right grab rail support 68 is coupled to the roof structure 42 with three fasteners 82 in the illustrated embodiment, in other embodiments, the right grab rail support may be coupled to the roof structure with more or fewer fasteners. Furthermore, in certain embodiments, the right grab rail support may be coupled to the roof structure by other suitable type(s) of connection(s) (e.g., alone or in combination with the fastener(s)), such as adhesive connection(s), welded connection(s), other suitable type(s) of connection(s), or a combination thereof.

In the illustrated embodiment, the right grab rail support 68 includes a first portion 84, which extends toward the roof structure 42 (e.g., within a plane formed by a longitudinal axis 86 and a lateral axis 88 of the roof assembly 12). In addition, the right grab rail support 68 includes a second portion 90, which extends upwardly along a vertical axis 92 of the roof assembly 12. In the illustrated embodiment, the first portion 84 extends through an opening 94 into an interior 96 of the roof structure 42. Engagement of the first portion 84 of the right grab rail support 68 with the roof structure 42 at the opening 94 may substantially block rotation of the right grab rail support 68 relative to the roof structure 42. In addition, the right grab rail support 68 is coupled to the roof structure 42 by the fasteners 82 at a distal end 98 of the first portion 84, thereby establishing two regions of engagement between the right grab rail support 68 and the roof structure 42. While the right grab rail support 68 extends through the opening 94 in the roof structure 42 and couples to the roof structure 42 at a location separate from the opening in the illustrated embodiment, in other embodiments, the right grab rail support may couple to the roof structure at the opening (e.g., alone or in combination with a separate coupling to the roof structure). Furthermore, while the right grab rail support 68 includes a first portion 84 extending toward the roof structure 42 and a second portion 90 extending upwardly along the vertical axis 92 in the illustrated embodiment, in other embodiments, the right grab rail support may include any suitable number of portions (e.g., 1, 3, 4, or more), and each portion may extend in any suitable direction relative to the roof structure. As used herein, "interior of the roof structure" refers to the space/volume formed between the roof structure 42 and the roof panel 32.

In the illustrated embodiment, the roof assembly 12 includes a first seal 100 disposed about the right grab rail support 68 (e.g., the first portion 84 of the right grab rail support 68) within the interior 96 of the roof structure 42. The first seal 100 is configured to contact the roof structure 42 to substantially block water flow through a first interface 102 between the right grab rail support 68 and the roof structure 42. In addition, the roof assembly 12 includes a second seal 104 disposed about the right grab rail support 68 (e.g., the first portion 84 of the right grab rail support 68) within the interior 96 of the roof structure 42. The second seal 104 is configured to contact the roof structure 42 to substantially block water flow through a second interface 106 between the right grab rail support 68 and the roof structure 42. Furthermore, in the illustrated embodiment, the roof assembly 12 includes a mount 108 configured to interface with the right grab rail support 68 and the roof structure 42 to distribute the load applied by the right grab rail support 68 over a larger area of the roof structure 42. While the roof assembly 12 includes the first seal 100, the second seal 104, and the mount 108 in the illustrated embodiment, in other embodiments, at least one of the first seal, the second seal, and the mount may be omitted. Furthermore, in certain embodiments, the roof assembly may include any other suitable element(s) to block water flow through an interface between the right grab rail support and the roof structure and/or any other suitable element(s) to distribute the load applied by the right grab rail support over a larger area of the roof structure.

As previously discussed, the right grab rail support 68 has a hollow passage 110 configured to facilitate passage of a wire 72. In addition, the right grab rail support 68 has an inlet 112 to the hollow passage 110 positioned at the interior 96 of the roof structure 42 to enable the wire 72 to extend from the interior 96 of the roof structure 42 into the hollow passage 110. As previously discussed, the right grab rail support 68 has outlets 74 configured to enable one or more wires 72 to extend out of the hollow passage 110 to respective device(s) external to the right grab rail support 68 (e.g., the light(s) 76, the antenna 80, etc.). Because the wire 72 may extend from the interior 96 of the roof structure 42 to respective device(s) external to the right grab rail support 68 via the hollow passage 110 in the right grab rail support 68, the number of openings in the roof structure 42/roof panel configured to facilitate passage of wires through the roof structure/roof panel may be reduced, thereby reducing the complexity and cost associated with sealing the openings. Furthermore, because the wire 72 is concealed within the right grab rail support 68, the appearance of the roof assembly 12 may be enhanced (e.g., as compared to a roof assembly in which the wire extends along an exterior surface of the roof structure/exterior surface of the roof panel).

As discussed in detail below, the right grab rail support 68 is formed from multiple plates coupled to one another. In the illustrated embodiment, the right grab rail support 68 includes a first longitudinal plate 114, a second longitudinal plate 116, a first lateral plate 118, and a second lateral plate 120. The plates may be coupled to one another by any suitable type of connection(s) (e.g., welded connection(s), adhesive connection(s), fastener connection(s), etc.). In addition, while the right grab rail support 68 includes two longitudinal plates and two lateral plates in the illustrated embodiment, in other embodiments, the right grab rail support may include any suitable number of plates in any suitable arrangement. Furthermore, while the right grab rail support is formed from plates in the illustrated embodiment, in other embodiments, the right grab rail support may be formed from any other suitable structure(s) (e.g., round tube, polygonal tube, etc.).

In the illustrated embodiment, the longitudinal plates do not extend into the interior 96 of the roof structure 42, thereby forming the inlet 112 to the hollow passage 110. However, in other embodiments, the inlet to the hollow passage may be formed by another suitable configuration, such as an opening in a portion of the right grab rail support that extends into the interior of the roof structure, etc. Furthermore, while the longitudinal plates do not extend into the interior of the roof structure in the illustrated embodiment, in other embodiments, at least one of the longitudinal plates may extend into the interior of the roof structure. In addition, while the lateral plates extend into the interior of the roof structure in the illustrated embodiment, in other embodiments, at least one of the lateral plates may not extend into the interior of the roof structure.

In the illustrated embodiment, the inlet 112 to the hollow passage 110 includes a recess 122 formed in the first lateral plate 118. The recess 122 facilitates passage of the wire 72 into the hollow passage 110 via the inlet 112. While a single recess is formed in the first lateral plate in the illustrated embodiment, in other embodiments, more or fewer recesses (e.g., 0, 2, 3, 4, or more) may be formed in the first lateral plate, and/or one or more recesses (e.g., 1, 2, 3, 4, or more) may be formed in at least one other plate. For example, in certain embodiments, the inlet to the hollow passage may not include any recesses. In the illustrated embodiment, a pad 124 is coupled to the first lateral plate 118 and extends along the recess 122. The pad 124 is configured to reduce wear on the wire 72 during operation of the work vehicle, thereby enhancing the longevity of the wire. While the pad extends along the recess in the illustrated embodiment, in other embodiments, the pad may be omitted. Furthermore, in embodiments including multiple recesses, pad(s) may extend along one or more respective recesses.

Figure 5:
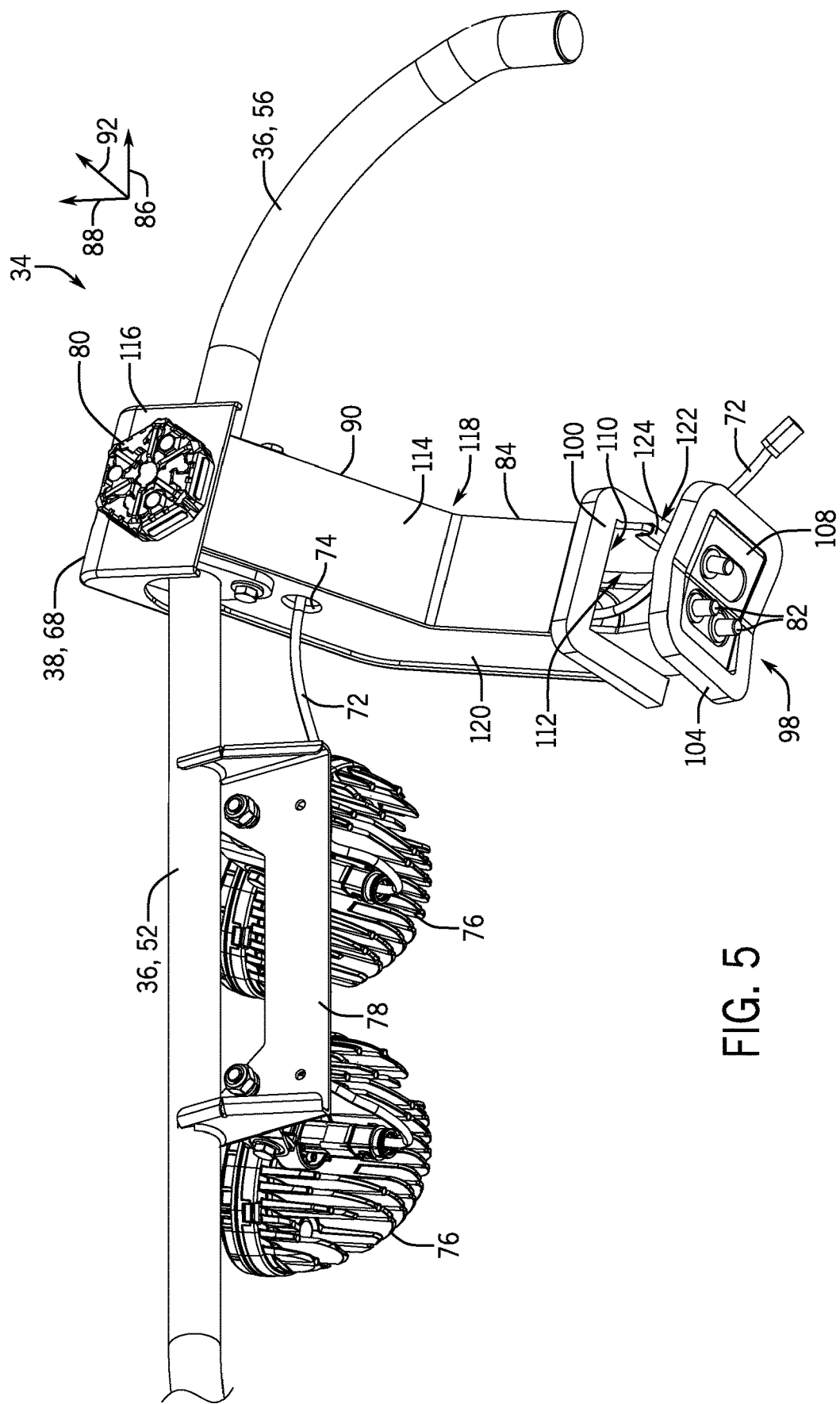
FIG. 5 is another perspective view of the grab rail support of FIG. 3.

FIG. 5 is another perspective view of the right grab rail support 68 of FIG. 3. As previously discussed, the right grab rail support 68 has outlets 74 configured to enable one or more wires 72 to extend out of the hollow passage 110 to respective device(s) external to the right grab rail support 68. In the illustrated embodiment, the wire 72 extends out of an outlet 74 in the second lateral plate 120 to the lights 76 coupled to the right grab rail 52. In certain embodiments, a grommet may be disposed within the outlet 74 and configured to engage the wire 72. The grommet may substantially block water flow into the hollow passage 110. In certain embodiments, each outlet of the grab rail assembly 34 may include a respective grommet or other suitable seal. However, in other embodiments, at least one outlet of the grab rail assembly may not include a respective grommet/seal.

Furthermore, while the wire 72 extends through an outlet 74 in the illustrated embodiment, in other embodiments, the wire may terminate within the hollow passage of the right grab rail support. For example, the wire may extend to a device (e.g., sensor, light, etc.) disposed within the hollow passage. In certain embodiments, one or more wires may extend through one or more outlets of the right grab rail support, and/or one or more wires may terminate within the hollow passage of the right grab rail support. Furthermore, in certain embodiments, at least one wire may extend into a hollow passage of a grab rail. For example, a hollow passage of a grab rail may be aligned with a respective outlet of the right grab rail support. A wire may extend through the hollow passage of the right grab rail support, through the respective outlet, and into the hollow passage of the grab rail. The wire may terminate within the hollow passage of the grab rail (e.g., at a sensor, at a light, etc.), or the wire may extend through an outlet of the grab rail to a device external to the grab rail (e.g., a light, an antenna, etc.).

Furthermore, in certain embodiments, the right grab rail support 68 may include one or more protrusions configured to block light emitted from a light source coupled to the right grab rail support. For example, in certain embodiments, a flashing light beacon may be coupled to a top surface of the second longitudinal plate 116 (e.g., proximate to the antenna 80, instead of the antenna, etc.). In such embodiments, a protrusion may extend from the top surface of the second longitudinal plate, and the protrusion may be positioned between the flashing light beacon and a mirror of the work vehicle. As a result, light from the flashing light beacon toward the mirror may be substantially blocked, thereby substantially reducing or eliminating operator perception of the light from the flashing light beacon.

Figure 6:
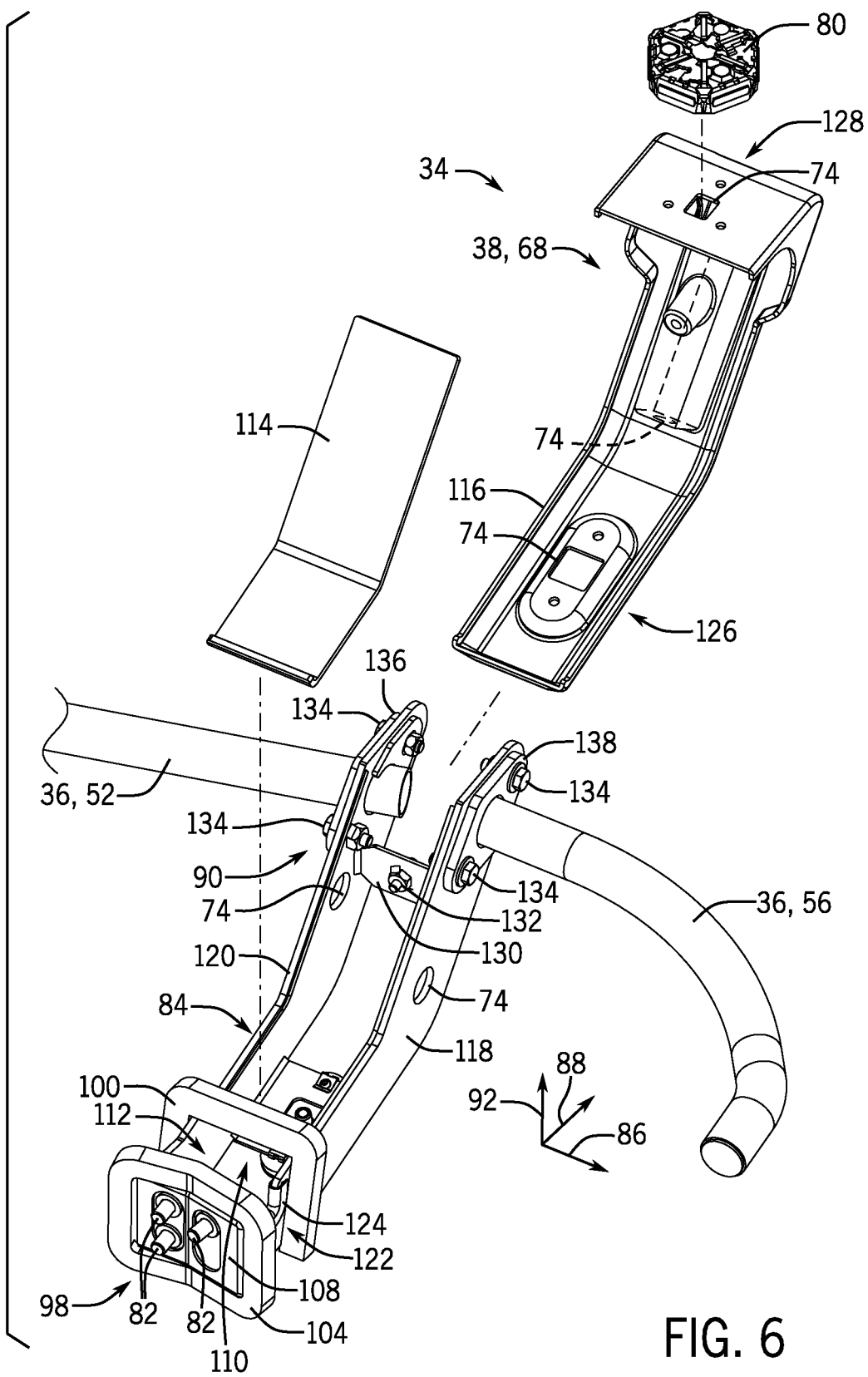
FIG. 6 is an exploded view of the grab rail support of FIG. 3.

FIG. 6 is an exploded view of the right grab rail support 68 of FIG. 3. As previously discussed, the right grab rail support 68 includes a first longitudinal plate 114, a second longitudinal plate 116, a first lateral plate 118, and a second lateral plate 120. The plates may be coupled to one another by any suitable type of connection(s) (e.g., welded connection(s), adhesive connection(s), fastener connection(s), etc.). In the illustrated embodiment, each plate is bent to form the first portion 84 and the second portion 90 of the right grab rail support 68. Furthermore, in the illustrated embodiment, the first lateral plate 118 includes a single outlet 74. However, in other embodiments, the first lateral plate may include more or fewer outlets (e.g., 0, 2, 3, 4, or more). In addition, in the illustrated embodiment, the second lateral plate 120 includes a single outlet 74. However, in other embodiments, the second lateral plate may include more or fewer outlets (e.g., 0, 2, 3, 4, or more). Furthermore, in the illustrated embodiment, the first longitudinal plate 114 does not include any outlets. However, in other embodiments, the first longitudinal plate may include any suitable number of outlets (e.g., 1, 2, 3, 4, or more). In the illustrated embodiment, the second longitudinal plate 116 includes three outlets 74. However, in other embodiments, the second longitudinal plate may include more or fewer outlets (e.g., 0, 1, 2, 4, or more). Indeed, the right grab rail support 68 may include any suitable number of outlets (e.g., 0, 1, 2, 3, 4, 5, 6, 7, 8, 9, 10, or more).

In the illustrated embodiment, the second lateral plate 116 includes a first set of mounting features 126 at one outlet 74 and a second set of mounting features 128 at another outlet 74. The mounting features are configured to facilitate coupling of a device to the right grab rail support 68. For example, the first mounting features 126 include a recess and mounting holes, and the second mounting features 128 include mounting holes. The recess is configured to receive a respective device, and the mounting holes are configured to facilitate coupling a respective device to the right grab rail support. For example, the antenna 80 may be coupled to the second longitudinal plate 116 of the right grab rail support 68 via fasteners extending through the mounting holes. One or more mounting features may be positioned proximate to any of the outlets disclosed herein to facilitate coupling a respective device to the right grab rail mount. Furthermore, in certain embodiments, no mounting features may be positioned proximate to at least one outlet.

In the illustrated embodiment, the right grab rail support 68 includes a brace 130 extending between the first and second lateral plates. The brace 130 may be coupled to the lateral plates via any suitable type(s) of connection(s) (e.g., welded connection(s), adhesive connection(s), fastener connection(s), etc.). The brace 130 is configured to enhance the structural rigidity of the right grab rail support 68 and to facilitate coupling the second longitudinal plate 116 to the first and second lateral plates. In the illustrated embodiment, the second longitudinal plate 116 is coupled to the brace 130 via one or more fasteners 132. However, in other embodiments, the second longitudinal plate may be coupled to the brace via other suitable type(s) of connection(s) (e.g., alone or in combination with the fastener(s)), such as welded connection(s), adhesive connection(s), other suitable type(s) of connection(s), or a combination thereof. Furthermore, in certain embodiments, the second longitudinal plate may be coupled to the first and second lateral plates via other suitable connection(s) (e.g., alone or in combination with the connection to the brace). While the right grab rail support 68 includes a single brace 130 in the illustrated embodiment, in other embodiments, the right grab rail support may include more or fewer braces (e.g., 0, 2, 3, 4, or more).

In the illustrated embodiment, the right grab rail 52 and the rearward right grab rail 56 are coupled to the right grab rail support 68 via fasteners 134. As illustrated, the right grab rail 52 includes a flange 136 coupled to the second lateral plate 120 via the fasteners 134, and the rearward right grab rail 56 includes a flange 138 coupled to the first lateral plate 118 via the fasteners 134. Any suitable number of fasteners may be used to couple each grab rail to the right grab rail support. While each grab rail includes a flange and is coupled to the right grab rail support via fasteners in the illustrated embodiment, in other embodiments, at least one grab rail may not include a flange, and/or at least one grab rail may be coupled to the right grab rail support via other suitable type(s) of connection(s) (e.g., alone or in combination with the fastener(s)), such as welded connection(s), adhesive connection(s), other suitable type(s) of connection(s), or a combination thereof.

Figure 7:
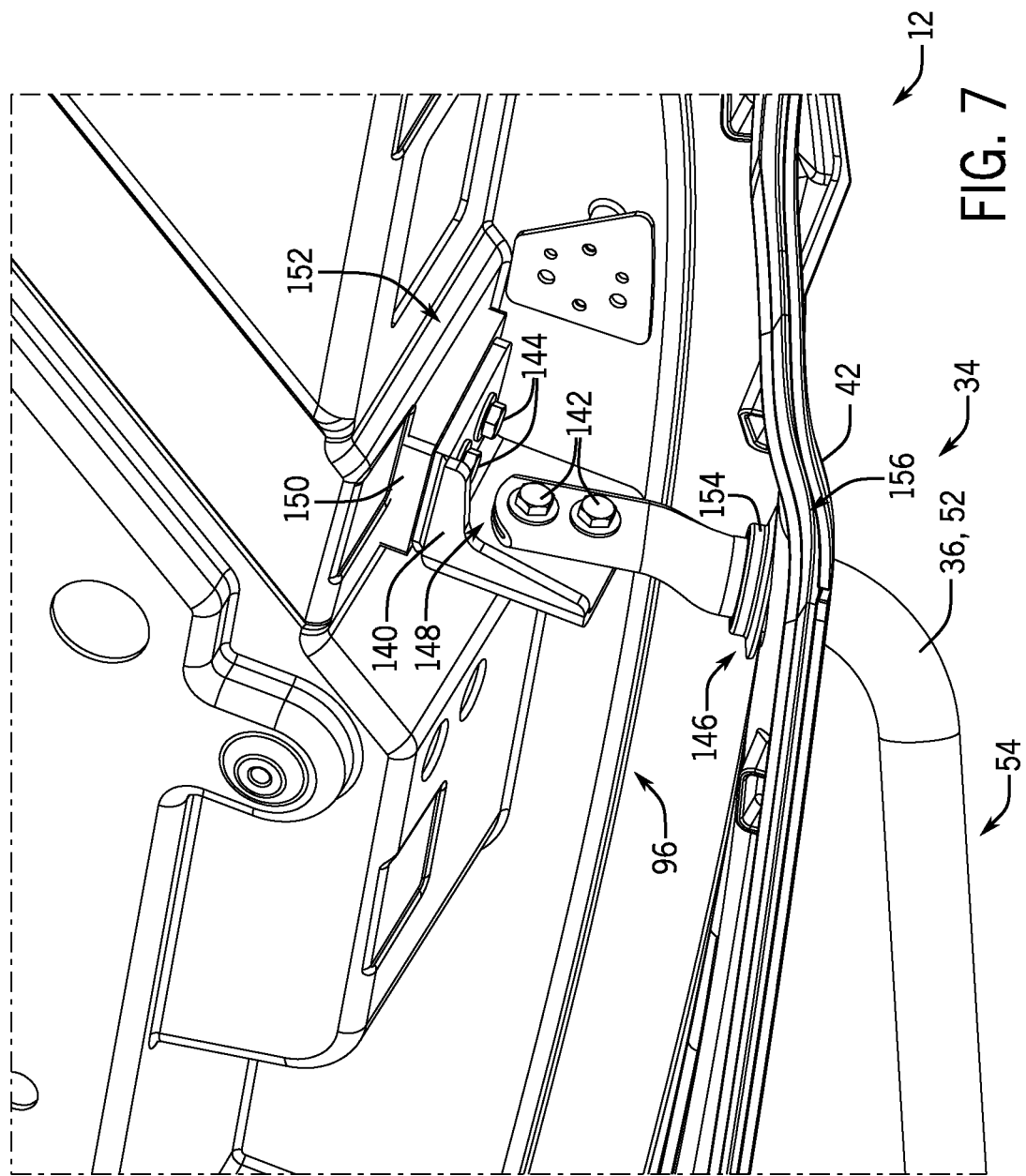
FIG. 7 is a perspective view of a grab rail of FIG. 3, in which the grab rail is coupled to the roof structure.

FIG. 7 is a perspective view of the right grab rail 52 of FIG. 3, in which the right grab rail 52 is coupled to the roof structure 42. In the illustrated embodiment, the right grab rail 52 is coupled to the roof structure 42 via a bracket 140. The right grab rail 52 (e.g., second end of the right grab rail) is coupled to the bracket 140 via fasteners 142, and the bracket 140 is coupled to the roof structure 42 via fasteners 144. While two fasteners 142 couple the right grab rail 52 to the bracket 140 in the illustrated embodiment, in other embodiments, the right grab rail may be coupled to the bracket via more or fewer fasteners (e.g., 1, 3, 4, or more). Furthermore, in certain embodiments, the right grab rail may be coupled to the bracket by other suitable type(s) of connection(s) (e.g., alone or in combination with the fastener(s)), such as welded connection(s), adhesive connection(s), other suitable type(s) of connection(s), or a combination thereof. In addition, while two fasteners 144 couple the bracket 140 to the roof structure 42 in the illustrated embodiment, in other embodiments, the bracket may be coupled to the roof structure via more or fewer fasteners (e.g., 1, 3, 4, or more). Furthermore, in certain embodiments, the bracket may be coupled to the roof structure by other suitable type(s) of connection(s) (e.g., alone or in combination with the fastener(s)), such as welded connection(s), adhesive connection(s), other suitable type(s) of connection(s), or a combination thereof. While the right grab rail 52 is coupled to the roof structure 42 via the bracket 140 in the illustrated embodiment, in other embodiments, the bracket may be omitted.

In the illustrated embodiment, the right grab rail 52 extends through an opening 146 into the interior 96 of the roof structure 42. Engagement of the right grab rail support 52 with the roof structure 42 at the opening 146 may substantially block rotation of the right grab rail 52 relative to the roof structure 42 (e.g., at least about certain axes). In addition, the right grab rail 52 is coupled to the roof structure 42 via the bracket 140 at a distal end 148 (e.g., second end) of the right grab rail 52, thereby establishing two regions of engagement between the right grab rail 52 and the roof structure 42. While the right grab rail 52 extends through the opening 146 in the roof structure 42 and couples to the roof structure 42 at a location separate from the opening in the illustrated embodiment, in other embodiments, the right grab rail may couple to the roof structure at the opening (e.g., alone or in combination with a separate coupling to the roof structure).

In the illustrated embodiment, the roof assembly 12 includes a third seal 150 disposed between the bracket 140 and the roof assembly 42. The third seal 150 is configured to substantially block water flow through a third interface 152 between the bracket 140 and the roof structure 42. In addition, the roof assembly 12 includes a fourth seal 154 disposed about the right rail 52 within the opening 146. The fourth seal 154 is configured to contact the roof structure 42 to substantially block water flow through a fourth interface 156 between the right grab rail 52 and the roof structure 42. While the roof assembly includes the third seal 150 and the fourth seal 154 in the illustrated embodiment, in other embodiments, the third seal and/or the fourth seal may be omitted. Furthermore, in certain embodiments, the roof assembly may include any other suitable element(s) to block water flow through the interface between the right grab rail and the roof structure, and/or the roof structure may include any other suitable element(s) to block water flow through the interface between the bracket and the roof structure. While the right grab rail 52, the rearward right grab rail 56, and the right grab rail support 68 are disclosed herein with respect to FIGS. 3-7, any of the features, details, and variations disclosed with respect to the right grab rail, the rearward right grab rail, and the right grab rail support may apply to the left grab rail, the rearward left grab rail, and the left grab rail support, respectively.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A roof assembly for a work vehicle, comprising:
a grab rail; and
a grab rail support coupled to the grab rail, wherein the grab rail support is configured to couple to a roof structure of the roof assembly, the grab rail support is configured to support the grab rail on the roof structure, the grab rail support has a hollow passage configured to facilitate passage of a wire, and the grab rail support has an inlet to the hollow passage configured to be positioned at an interior of the roof structure to enable the wire to extend from the interior of the roof structure into the hollow passage.

2. The roof assembly of claim 1, comprising a seal disposed about the grab rail support, wherein the seal is configured to be disposed within the interior of the roof structure, and the seal is configured to contact the roof structure to substantially block water flow through an interface between the grab rail support and the roof structure.

3. The roof assembly of claim 1, comprising a first plurality of fasteners configured to couple the grab rail support to the roof structure.

4. The roof assembly of claim 1, wherein the grab rail support has an outlet configured to enable the wire to extend out of the hollow passage to a device external to the grab rail support.

5. The roof assembly of claim 1, comprising a second plurality of fasteners coupling the grab rail support to the grab rail.

6. The roof assembly of claim 1, wherein the grab rail support is formed by a plurality of plates coupled to one another.

7. The roof assembly of claim 6, wherein the inlet of the grab rail support comprises a recess in one plate of the plurality of plates.

8. The roof assembly of claim 7, comprising a pad coupled to the one plate and extending along the recess.

9. A roof assembly for a work vehicle, comprising:
a roof structure;
a grab rail; and
a grab rail support coupled to the grab rail and to the roof structure, wherein the grab rail support is configured to support the grab rail on the roof structure, the grab rail support has a hollow passage configured to facilitate passage of a wire, and the grab rail support has an inlet to the hollow passage positioned at an interior of the roof structure to enable the wire to extend from the interior of the roof structure into the hollow passage.

10. The roof assembly of claim 9, wherein the roof structure is an element of a rollover protection system (ROPS) of the work vehicle.

11. The roof assembly of claim 9, comprising a seal disposed about the grab rail support within the interior of the roof structure, wherein the seal contacts the roof structure to substantially block water flow through an interface between the grab rail support and the roof structure.

12. The roof assembly of claim 9, wherein the grab rail support has an outlet configured to enable the wire to extend out of the hollow passage to a device external to the grab rail support.

13. The roof assembly of claim 9, comprising a second grab rail coupled to the roof structure.

14. The roof assembly of claim 13, wherein the grab rail and the second grab rail are only coupled to the roof structure, to the grab rail support, or a combination thereof.

15. A roof assembly for a work vehicle, comprising:
a plurality of grab rails configured to be distributed about a periphery of a roof structure of the roof assembly; and
a plurality of grab rail supports configured to couple to the roof structure, wherein each grab rail support of the plurality of grab rail supports is coupled to at least one grab rail of the plurality of grab rails and configured to support the at least one grab rail on the roof structure, at least one grab rail support of the plurality of grab rail supports has a hollow passage configured to facilitate passage of a wire, and the at least one grab rail support has an inlet to the hollow passage configured to be positioned at an interior of the roof structure to enable the wire to extend from the interior of the roof structure into the hollow passage.

16. The roof assembly of claim 15, wherein the at least one grab rail support has an outlet configured to enable the wire to extend out of the hollow passage to a device external to the at least one grab rail support.

17. The roof assembly of claim 15, comprising at least one light coupled to at least one grab rail of the plurality of grab rails.

18. The roof assembly of claim 15, wherein one or more grab rails of the plurality of grab rails are configured to couple to the roof structure.

19. The roof assembly of claim 15, wherein the at least one grab rail support is formed by a plurality of plates coupled to one another.

20. The roof assembly of claim 19, wherein the inlet of the at least one grab rail support comprises a recess in one plate of the plurality of plates.

* * * * *